United States Patent Office 3,318,954
Patented May 9, 1967

3,318,954
PROCESS FOR THE PRODUCTION OF QUATERNARY AMMONIUM COMPOUNDS
Michael Daniel Curtin, Jr., Colerain Township, Hamilton County, Ohio, assignor to The Procter & Gamble Company, Cincinnati, Ohio, a corporation of Ohio
No Drawing. Filed Apr. 24, 1964, Ser. No. 362,500
8 Claims. (Cl. 260—567.6)

This invention relates to the production of quaternary ammonium compounds by the reaction of specific quaternizing agents with tertiary amines. Specifically, this invention relates to new and improved catalysts for such processes.

It has been known in the prior art that alkaline materials can be used as catalysts for quaternizing amines. Sodium hydroxide and sodium bicarbonate each have been specifically suggested as sole catalyst. It has been discovered, however, that both of these catalysts have certain drawbacks when the cation of the quaternizing agent contains an alkyl glyceryl ether group. For example, the use of sodium hydroxide alone gives rise to a rather violent reaction and the color of the product is quite dark. On the other hand, the use of sodium bicarbonate alone results in a very slow reaction and because of the length of the time of the reaction at elevated temperatures the product of this reaction is also dark.

Accordingly, it is an object of this invention to provide an improved process for preparing quaternary ammonium compounds. It is a more specific object of this invention to provide an improved process for quaternizing tertiary amines with a quaternizing agent containing an alkyl glyceryl ether group in the portion of the agent which helps form the cation.

It is a further object of this invention to provide a process for preparing quaternary ammonium compounds, which is fast and gives products having good color.

The objects of this invention can be achieved by providing a process for preparing quaternary compounds comprising a reaction in which an agent having the formula

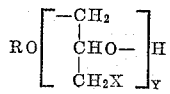

wherein R is a hydrocarbon group containing from about 2 to about 22 carbon atoms, Y is an integer of from 1 to about 2, and X is an anion selected from the group consisting of chloride, bromide, iodide, and methyl sulfate anions is reacted with a tertiary amine having the formula

wherein $R^2$ and $R^3$ are each selected from the group consisting of methyl and ethyl groups and $R^1$ is an alkyl group containing from about 2 to about 22 carbon atoms, said reaction occurring in the presence of a catalyst consisting of a homogeneous mixture of sodium bicarbonate and sodium hydroxide, the ratio of sodium bicarbonate to sodium hydroxide being from about 19:1 to about 2:1, said reaction taking place at a temperature of from about 100° F. to about 315° F. and sufficiently high to provide an essentially homogeneous reaction mixture; and said reaction occurring for from about ½ minute to about 5 minutes, whereby quaternary ammonium compounds are produced in good yield and having good color. All ratios, parts and percentages herein are by weight unless otherwise specified.

The quaternizing agents of this invention, as hereinbefore described, have the formula

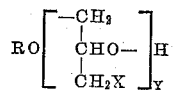

wherein R is a hydrocarbon group containing from about 2 to about 22 carbon atoms, preferably an alkyl group, e.g., an ethyl, propyl, hexyl, octyl, decyl, dodecyl, tetradecyl, hexadecyl, octadecyl or eicosyl group. The hydrocarbon group, R, can also contain or be an aryl group, e.g., it can be a dodecyl phenyl, methylphenyl, tetradecyl phenyl, decyl phenyl, hexyl phenyl, phenyl, or benzyl group. X in the above formula, as hereinbefore stated, is selected from the group consisting of chloride, bromide, iodide and methyl sulfate anions. Selection of the hydrocarbon, R, group, or mixtures of groups, is dependent upon the final use of the quaternary ammonium compound. It is desirable to use mixtures, especially naturally occurring mixtures, of hydrocarbon, R, groups such as alkyl groups derived from coconut oil and tallow by production of the corresponding fatty alcohols. However, the source or nature of the alkyl or other hydrocarbon, R, groups is not a limitation as regards the process of this invention. "Alkyl groups," as used herein, includes unsaturated alkyl groups. In a preferred embodiment of this invention, the numbers of carbon atoms in the chain of the quaternizing group should be about the same as in the long alkyl group, $R^1$, of the tertiary amine hereinafter described. This enables the quaternizing agent and the amine to mix more readily under the conditions of the reaction.

Y generally is about one, but can be two. Mixtures of mono- and di-ethers are normally used.

As hereinbefore stated, the eventual use of the quaternary compound determines the character of the alkyl or other hydrocarbon groups. In general, the carbon atom content of the quaternizing agent (including the glyceryl group) is about $C_{10}$ or less if the quaternary ammonium compound is to be used primarily as a bactericide. If the quaternary compound is to be used as a fabric softener the number of carbon atoms in the chain of the quaternizing agent is preferably from $C_{10}$ to about $C_{22}$. Shorter chain lengths can also be used in this agent, however, since the amine can bear a sufficiently long alkyl chain to confer softening characteristics on the quaternary compound. However, as stated hereinbefore, it is desirable, for purposes of the reaction, to have the same number of carbon atoms in both the chain of the quaternizing agent and the long alkyl chain of the amine. "Chain" when used herein without qualification refers to heterogeneous chains including ether linkages as well as chains of carbon atoms.

The tertiary amines which can be used in the process of this invention have two short alkyl substituents, $R_2$ and $R_3$, such as methyl and/or ethyl groups. These short chains can be either the same or different in length. The amines also contain one relatively long alkyl group, $R_1$, which can be either ethyl, propyl, hexadecyl, octyl, decyl, dodecyl, tetradecyl, octadecyl or eicosyl. Mixtures of these amines having different long alkyl groups can be used and are preferred. For example, the alkyl group in the amine reactant can be derived from fatty alcohols, e.g., those prepared from coconut oil and tallow or from mixtures of alkyl groups prepared from e.g., petroleum fractions. The source of the alkyl groups is immaterial as regards the process. Unsaturated alkyl groups are, of course, suitable.

The selection of particular amines for the process is dependent upon the eventual use of the quaternary compound formed. As with the quaternizing agent, amines containing $R_1$ alkyl groups of $C_{10}$ or less are used when it is desired to use the quaternary ammonium compound as, e.g., a bactericide. When the quaternary ammonium compound is to be used as a softening agent for textiles, the $R_1$ alkyl chain of the amine should range from about $C_{10}$ to about $C_{22}$.

The reaction by which the quaternary ammonium compound is formed is believed to proceed as follows:

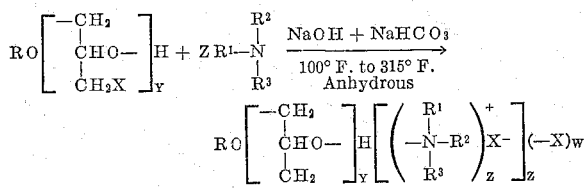

wherein R, $R^1$, $R^2$, $R^3$, Y and X have the same meanings as hereinbefore set forth. Z is an integer equal to or smaller than Y and $Z+W=Y$. The effectiveness of the particular synergistic catalyst mixture of this invention is apparently dependent upon the presence of a glyceryl ether group in the quaternizing agent, although it is not desired to be bound by this hypothesis.

The quaternizing agent and amine are normally used in a molar ratio of 1:1. However, molar ratios of quaternizing agent to amine from about 2:1 to about 1:2 on a molar basis can be used. Preferably no more than 10% molar excess of either reactant should be used. All percentages and ratios herein are by weight unless otherwise specified.

As stated hereinbefore, the catalyst for this reaction consists of a mixture of sodium bicarbonate and sodium hydroxide wherein the ratios of sodium bicarbonate to sodium hydroxide range from about 19:1 to 2:1, preferably from about 12.5:1 to about 3:1. Especially preferred is a ratio of about 5.5:1. Although any amount of catalyst will promote the reaction to a certain extent, it is desirable to have from about 0.1 to about 1%, preferably from about 0.4 to about 0.8%, and more preferably, about 0.7% by weight of NaOH based on the reaction mixture. The sodium hydroxide and the sodium bicarbonate are used in anhydrous form. Conveniently the sodium hydroxide is originally in the form of anhydrous pellets and the sodium bicarbonate is in the form of anhydrous powder. The presence of water in the reaction system tends to promote corrosion of the reaction vessel and concomitant increased possibility of discoloration of the reaction product. Desirably the amount of water in the reaction system is not greater than about ½%, for these reasons.

As stated hereinbefore, the use of sodium hydroxide without sodium bicarbonate results in a very violent reaction (which may be explosive) and a consequent discoloration of the reaction product. However, when sodium bicarbonate is added to the reaction mixture with sodium hydroxide in the above ratios the reaction proceeds rapidly and smoothly without violence, even though sodium bicarbonate by itself gives only a very slow reaction. The color of the quaternary ammonium compound formed is highly acceptable when the synergistic combination of catalysts is used.

A preferred technique for continuous reactions by which the catalyst can be added to the reaction mixture involves adding the sodium hydroxide in anhydrous pellet form to the amine in liquid form. The amine is then heated to assure maximum solubility of the sodium hydroxide in the amine. The sodium bicarbonate is dissolved in the quaternizing agent and the quaternizing agent is also heated to aid in forming a pasty mixture of the quaternizing agent and the sodium bicarbonate. Then the reactants in mixture with the individual catalytic components are combined with mixing and heated to the appropriate reaction temperature.

In order to aid in the mixing of the reaction mixture it is desirable to aid the fluidity of the reaction mixture by adding a small amount, e.g., up to about 30% by weight of the reaction mixture, of a lower molecular weight alcohol. Alcohols which are suitable for this purpose include methyl, ethyl and isopropyl alcohols. Other solvents may also be used such as lower molecular weight aldehydes, ketones, ethers, and hydrocarbons. Examples of these include acetone, methyl isobutyl ketone, pentane, hexane, octane, diethylether, formaldehyde, or combinations of the above. The solvent used should be one which does not enter into with the reaction and which can be distilled from a reaction mixture, if desired, at or near the temperature at which the reaction is carried out. The solvent is preferably added near the end of the reaction in order to cool the reaction mixture. The solvent can then be removed or, preferably, can be left in the product. When the solvent is in the product, the product can be more easily handled either in shipping or in usage. For example, it is much easier to incorporate the solvent/quaternary-ammonium-compound mixture into other mixtures or solvents. If the solvent is removed, the product becomes a hard mass which must be flaked or beaded if it is desired to use the product in liquids.

As stated hereinabove, the reaction is normally carried out at a temperature of from about 100° F. to about 315° F., preferably 190° F. to 210° F. At these temperatures, the reaction produces about 90% of the theoretical weight yield of the desired quaternary ammonium compound in a reaction time of about ½ minute to about 5 minutes. Preferably the reaction time is from about 3 to about 4 minutes. Reaction time, as used herein, refers to the time the reaction mixture is maintained at elevated temperatures of the reaction vessel. It is understood that the reaction may very well continue after the temperature is lowered. The percentage yields described are the final yields.

The pressure at which the reaction is carried out is immaterial, but it is normally carried out at atmospheric pressure.

The following examples illustrate the practice of this invention. They should not be taken as limiting, in any way, the scope of the invention.

EXAMPLE I 3.8 pounds of sodium bicarbonate and 0.7 pound of sodium hydroxide were added to 53.4 pounds of tallow alkyl ether of chlorohydrin. This ether is the reaction product of alcohols derived from substantially completely hydrogenated tallow with epichlorohydrin according to the reaction described in U.S. Patent 3,024,273. There is about 75% monoether, about 17.8% diether, about 4.8% alcohol, and the balance impurities. 39.6 pounds of 95% dimethylalkylamine was added to this mixture of catalyst and ether. (The 5% balance was di- and mono-amines and organic impurities.) The alkyl was determined by analysis to be 3.5% $C_{14}$, ½% $C_{15}$, 30% $C_{16}$, 1½% $C_{17}$, 62.5% $C_{18}$, and 2% not determined due to analytical limitations. The reaction mixture was maintained at about 285° F. for about five minutes in a 30-gallon stainless steel reactor which was agitated throughout by a 1000 r.p.m. agitator. During the reaction, 2.5 pounds of isopropanol was added to maintain fluidity and after the reaction period, about twenty pounds of isopropanol was added. The yield of quarternary compound having the formula

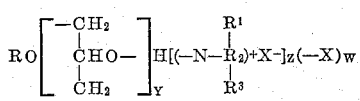

as hereinbefore defined was analyzed to be about 90% on a weight basis. This quaternary compound was useful as a softener for cotton fabric when deposited thereon from an aqueous bath.

A similar run was made at 255° F. The yield was about 91%.

EXAMPLE II 53.4 pounds of the amine and 39.6 pounds of the ether of Example I were mixed together in the reactor of Example I and 2.5 pounds of isopropanol was added to this mixture. 0.7 pound of NaOH and 3.8 pounds of sodium bicarbonate in admixture were then added and the mixture was allowed to react for about 30 seconds at 250° F. About 20 pounds of isopropanol was then added. The product of this reaction is the quaternary compound of Example I. The yield was about 91%.

A similar run was made in which the twenty pounds of isopropanol was added to the amine/ether mixture. The yield was about 90% after a one minute reaction at 215° F. and 15 p.s.i.g.

A similar run was made in which the catalyst mixture was added to the amine/ether mixture prior to addition of the 2.5 pounds of isopropanol and the reaction was continued for about 30 seconds at 215° F. Then 20 pounds of isopropanol was added. The yield for this run was about 93%. (When this run was repeated at 245° F. for about 1.5 minutes, the yield was about 97%.)

EXAMPLE III

About 2.14 pounds of the amine of Example I is mixed with about .03 pound of sodium hydroxide and heated to about 250° F. About 1.76 pounds of the ether of Example I is mixed with about .15 pound of sodium bicarbonate and heated to about 250° F. These mixtures are then combined with vigorous mixing and the temperature is maintained at 250° F. for about one minute while acetone is added as required to maintain fluidity until about .1 pound is added. After the reaction is adjudged complete, about .8 pound of acetone is added to increase fluidity of the reaction product which is the quaternary compound of Example I.

When hexyl dimethyl; octyl methyl ethyl, dodecyl diethyl; eicosyl dimethyl; propyl diethyl; ethyl dimethyl; decyl methyl ethyl; and tetradecyl dimethyl amines and mixtures thereof are substituted for all or part of the amine in the above example, substantially equivalent results are obtained in that the corresponding quaternaries of the above amines are produced.

Similarly, when the chloride in the ether in the above example is replaced by bromide, iodide, and methyl sulfate anions, substantially equivalent results are obtained in that the corresponding quaternaries are produced.

Also, when the alkyl groups in the ether in the above example are replaced, either wholly or in part, by ethyl, propyl, hexyl, octyl, decyl, dodecyl, eicosyl, dodecyl phenyl, methyl phenyl, tetradecyl phenyl, decyl phenyl, hexyl phenyl, phenyl, and benzyl groups, or mixtures thereof, then substantially equivalent results are obtained in that the corresponding quaternaries are produced. The quaternary compounds which are the reaction products of these reactions are useful as germicides when the total number of carbon atoms in each of the "long" chains of the quaternary compounds is from about 2 to about 10 and the quaternary compounds are useful as fabric softeners when each of their "long" chains contain from about 10 to about 22 carbon atoms.

When methyl and ethyl alcohols, formaldehyde, methyl isobutyl ketone, pentane, hexane, isopropyl alcohol, octane, diethyl ether or combinations of the above are substituted, either wholly or in part for the acetone in the above example, substantially equivalent results are obtained in that the fluidity of the reaction mixture is increased.

When 0.4% and 0.8% by weight of the reaction mixture of sodium hydroxide and sufficient sodium bicarbonate to provide a catalyst with ratios of sodium bicarbonate to sodium hydroxide of 12.5:1 and 3:1 respectively, are substituted for the catalyst in the above example, substantially equivalent results are obtained in that the speed of the quaternization reaction is increased relative to the uncatalyzed reaction.

What is claimed is:

1. A process for preparing quaternary compounds comprising reacting an agent having the formula

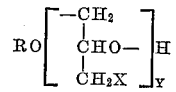

wherein R is selected from the group consisting of ethyl, propyl, hexyl, octyl, decyl, dodecyl, tetradecyl, hexadecyl, octadecyl, eicosyl, dodecyl phenyl, methyl phenyl, tetradecyl phenyl, decyl phenyl, hexyl phenyl, phenyl and benzyl groups and mixtures thereof, Y is an integer from 1 to about 2, and X is an anion selected from the group consisting of chloride, bromide, iodide and methyl sulfate anions, is reacted with a tertiary amine having the formula:

wherein $R_2$ and $R_3$ are each selected from the group consisting of methyl and ethyl groups and $R_1$ is selected from the group consisting of hexyl, octyl, dodecyl, hexadecyl, octadecyl, eicosyl, propyl, ethyl, decyl and tetradecyl groups; the catalyst for this reaction consisting of a homogeneous mixture of sodium bicarbonate and sodium hydroxide in anhydrous form, the ratio of sodium bicarbonate to sodium hydroxide being from about 19:1 to about 2:1; the reaction taking place at a temperature of from about 100° F. to about 315° F. and sufficiently high to provide an essentially homogeneous reaction mixture; said reaction occurring for from about one-half minute to about five minutes, and the reaction mixture containing not more than about ½% water, whereby quaternary ammonium compounds are produced in good yield and having good color.

2. The process of claim 1 wherein up to about 30% of a solvent selected from the group consisting of acetone, methyl, ethyl and isopropyl alcohols, formaldehyde, methyl isobutyl ketone, pentane, hexane, octane, diethyl ether, and mixtures thereof, is added to the reaction mixture.

3. The process of claim 1 wherein X is a chloride ion.

4. The process of claim 1 wherein the said agent contains not more than ten carbon atoms and $R^1$ contains from about 2 to about 10 carbon atoms.

5. The process of claim 1 wherein the said agent contains from about 10 to about 22 carbon atoms and $R_1$ contains from about 10 to about 22 carbon atoms.

6. The process of claim 1 wherein the ratio of sodium bicarbonate to sodium hydroxide is about 5.5 to 1.

7. The process of claim 1 wherein there is from about 0.1% to about 1% of sodium hydroxide present in the reaction mixture.

8. The process of claim 1 wherein the sodium hydroxide is mixed with said amine and the sodium bicarbonate is mixed with said quaternizing agent prior to mixing said amine and said quaternizing agent.

References Cited by the Examiner
UNITED STATES PATENTS 2,214,352   9/1940   Schoeller et al. _____ 260—567.6
3,175,008   3/1965   Shapiro et al. _____ 260—567.6

CHARLES B. PARKER, *Primary Examiner.*

ROBERT V. HINES, *Assistant Examiner.*